UNITED STATES PATENT OFFICE.

EDWARD MEAD JOHNSON, OF JERSEY CITY, AND JAMES J. QUILLIGAN, OF GRANTWOOD, NEW JERSEY, ASSIGNORS TO MEAD JOHNSON & CO., OF JERSEY CITY, NEW JERSEY, A CORPORATION OF NEW JERSEY.

INFANT FOOD.

1,171,724.      Specification of Letters Patent.      Patented Feb. 15, 1916.

No Drawing.      Application filed May 12, 1915. Serial No. 27,612.

*To all whom it may concern:*

Be it known that we, EDWARD MEAD JOHNSON, a citizen of the United States, residing at Jersey City, in the county of Hudson and State of New Jersey, and JAMES J. QUILLIGAN, a citizen of the United States, residing at Grantwood, in the county of Bergen and State of New Jersey, have invented certain new and useful Improvements in Infant Foods, of which the following is a specification.

This invention relates to infant foods and has for its object to provide a food preparation which may be safely and conveniently used in the feeding of marasmic or poorly nourished infants.

It is recognized that dextrin and maltose or malt sugar are of great value in feeding infants who, by reason of malnutrition, are in a marasmic or atrophic condition. These substances are commonly administered in the form of what is known as "malt soup," which comprises dextrin and maltose, wheat flour, cow's milk and water. The form in which dextrin and maltose have heretofore been available for the preparation of "malt soup" has been a thick, syrupy liquid known as "malt soup stock."

The use of the so-called malt soup stocks heretofore known as an infant food has been unsatisfactory for various reasons. It is recognized that dextrin and maltose should be mixed with wheat flour before giving it to the infant. The preparation of the infant food from the malt soup stock heretofore known involved mixing the syrup with a given quantity of water. A given quantity of wheat flour was then mixed with a given quantity of milk. These two solutions were then mixed and the combined product boiled. This somewhat complicated process necessary for the preparation of the food involved serious disadvantages. Owing to the ignorance or carelessness of the mothers by whom it had to be performed, great danger of inaccuracy in the proportion of the different ingredients was introduced, and particularly in the proportion of the flour to the dextrin and maltose. Failure of the mother to obtain precisely the correct proportions often resulted in the failure of the proper nourishment of the infant.

We have discovered that if dextrin and maltose are prepared in desiccated form wheat flour may be combined with the mixture while dry by thorough mixing. A uniform product is thus obtained containing the necessary elements of food for the marasmic infant in precisely the correct proportions.

In the preparation of our new food, we first obtain a mixture of desiccated dextrin and desiccated maltose in approximately equal parts. It is not necessary that the quantity of these two ingredients should be exactly equal, a variation of 5% being immaterial. We preferably use a slightly greater per cent. of maltose than dextrin, a desirable proportion being 52 parts of maltose to 46 parts of dextrin. We then take wheat flour and heat it to 160° to 180° F. to kill any animal life which it may contain. The desiccated dextrin and maltose and flour are then thoroughly mixed together. With these ingredients we preferably mix in also a small proportion of potassium carbonate, which is valuable as a tissue builder. The proportions of the various ingredients which we have found most successful in infant feeding are equal parts of wheat flour and the mixture of dextrin and maltose specified above, with $6\frac{9}{10}$ grains of potassium carbonate to each ounce of the mixture of dextrin and maltose, though we do not limit ourselves to the exact proportions specified.

The use of our new preparation is so simple that no mother can fail to use it correctly. It is simply necessary to mix the powdered food with the prescribed portion of milk and water and then boil the mixture for fifteen minutes. There is no danger of obtaining an incorrect proportion of dextrin and maltose and flour, as these ingredients are already correctly mixed together in the dry product. Thus, a definite proportion between the flour and the dextrin and maltose is maintained fixed and constant instead of leaving the proportion to the idiosyncracies of individual mothers, as was the case with the "malt soup stock" formerly used.

What we claim is:—

1. An infant food consisting of a mixture of desiccated dextrin, desiccated maltose, and wheat flour.

2. An infant food consisting of a mixture of desiccated dextrin and desiccated maltose and wheat flour, the amount of wheat flour in the mixture being substantially equal to the amount of dextrin plus the amount of maltose.

3. An infant food consisting of a mixture of desiccated dextrin, desiccated maltose, and wheat flour, in substantially the following proportions:—1 part dextrin, 1 part maltose, 2 parts wheat flour.

4. An infant food consisting of a mixture of desiccated dextrin, desiccated maltose, wheat flour, and a small percentage of potassium carbonate.

5. An infant food consisting of a mixture of desiccated dextrin, desiccated maltose, wheat flour, and a small percentage of potassium carbonate, the amount of wheat flour being substantially equal to the amount of dextrin plus the amount of maltose.

6. An infant food consisting of a mixture of 1 part desiccated dextrin, 1 part desiccated maltose, 2 parts wheat flour, and a small percentage of potassium carbonate.

In witness whereof, we have hereunto set our signatures.

EDWARD MEAD JOHNSON.
JAMES J. QUILLIGAN.

Witnesses:
FRED L. ROY,
GERTRUDE TANNER.